US007206739B2

(12) United States Patent
Lee

(10) Patent No.: US 7,206,739 B2
(45) Date of Patent: Apr. 17, 2007

(54) EXCITATION CODEBOOK SEARCH METHOD IN A SPEECH CODING SYSTEM

(75) Inventor: Dae-Ryong Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 836 days.

(21) Appl. No.: 10/155,272

(22) Filed: May 23, 2002

(65) Prior Publication Data

US 2003/0033136 A1 Feb. 13, 2003

(30) Foreign Application Priority Data

May 23, 2001 (KR) .............................. 2001-28451

(51) Int. Cl.
*G10L 21/00* (2006.01)
*G10L 19/14* (2006.01)
*G10L 15/00* (2006.01)

(52) U.S. Cl. ...................... 704/208; 704/205; 704/212; 704/240; 704/246

(58) Field of Classification Search ................ 704/212, 704/220, 208, 205, 240, 246
See application file for complete search history.

(56) References Cited

U.S. PATENT DOCUMENTS 3,624,302 A 11/1971 Atal
4,701,954 A 10/1987 Atal
5,504,833 A * 4/1996 George et al. .............. 704/211
5,587,998 A * 12/1996 Velardo et al. ............. 370/289
5,623,577 A * 4/1997 Fielder .................... 704/200.1
5,701,392 A * 12/1997 Adoul et al. ................ 704/219
2003/0065506 A1* 4/2003 Adut .......................... 704/207

OTHER PUBLICATIONS

K. Jarvinen et al., "Description of GSM Enhanced Full Rate Speech Codec", 1997 IEEE.

* cited by examiner

*Primary Examiner*—Richemond Dorvil
*Assistant Examiner*—Myriam Pierre
(74) *Attorney, Agent, or Firm*—The Farrell Law Firm

(57) ABSTRACT

A method for searching an excitation (or fixed) codebook in a speech coding system. In a speech coding system including a synthesis filter for synthesizing a speech signal, a fixed codebook searcher according to the present invention segments a speech signal frame into a plurality of subframes to generate an excitation signal to be used in a synthesis filter, segments again each of the subframes into a plurality of subgroups, and searches the respective subframes each comprised of a plurality of pulse position/amplitude combinations for pulses. The fixed codebook searcher searches the respective subgroups for a predetermine number of pulses having non-zero amplitude, and generates the searched pulses as an initial vector. Next, the fixed codebook searcher selects a pulse combination including at least one pulse among the pulses of the initial vector, and then substitutes pulses of the selected pulse combination for pulses in other positions in the subgroups. The selection and the substitution are repeatedly performed on all the pulses of the initial vector.

5 Claims, 5 Drawing Sheets

EXCITATION CODEBOOK SEARCH METHOD IN A SPEECH CODING SYSTEM

PRIORITY

This application claims priority to an application entitled "Excitation Codebook Search Method in a Speech Coding System" filed in the Korean Industrial Property Office on May 23, 2001 and assigned Serial No. 2001-28451, the contents of which are incorporated herein by reference.

BACKGROUND OF THE INVENTION

1. Field of the Invention

The present invention relates generally to a speech coding system, and in particular, to a method for searching an excitation codebook.

2. Description of the Related Art

There are several types of vocoders, which compress speech signals. A vocoder typically used in a current mobile communication system is a CELP (Code Excited Linear Predictive coding) vocoder based on a liner prediction technique. The CELP vocoder is divided into a linear prediction filter for managing a linear prediction operation and a section for generating an excitation signal corresponding to an input signal from the linear prediction filter. Further, the CELP vocoder includes a pitch filter for modeling a pitch of the speech. Information on the pitch filter is collected through a so-called adaptive codebook search. A method for generating the excitation signal is classified into a method of using a created physical codebook and another method of calculating a code vector in algebra. The latter method is called "ACELP (Algebraic Code Excited Linear Predictive coding)". In the field of speech coding, a way to search for a code vector using the above two methods is referred to as a "codebook search". As an alternative concept of the adaptive codebook for searching for the information on the pitch filter, a codebook for searching for an excitation signal is called a "fixed codebook" or "excitation codebook". For example, a speech coding system using a physical codebook and a linear prediction filter is disclosed in detail in U.S. Pat. Nos. 3,624,302 and 4,701,954.

The CELP technique using the physical codebook requires a large amount of memory and takes a great deal of time to search the codebook. Therefore, in most cases, the ACELP technique is used in the international standard for the vocoder. For example, a vocoder using the ACELP technique includes (i) EVRC (Enhanced Variable Rate Coding) used in a CDMA (Code Division Multiple Access) system, standardized by TIA/EIA/IS-127, EVRC and Speech Service Operation 3 for Wideband Spread Spectrum Digital Systems, and (ii) EFR (Enhanced Full Rate coding) chiefly used in a GSM (Global System for Mobile communication) mobile communication system, standardized by ESTI (European Telecommunication Standard Institute), disclosed in a paper entitled "GSM Enhanced Full Rate Speed Codec" K. Jarvinen et al. Proceedings ICASSP 1997 Intr'l Conf.

The ACELP technique segments an excitation signal applied to the pitch filter and the linear prediction filter into several subgroups, and sets a specific condition that each subgroup has a predetermined number of pulses with non-zero amplitude. Also, the ACELP technique reduces the number of multiplications by attaching a condition that the pulse has an amplitude of "+1" or "−1", resulting in a remarkable reduction in a calculation time required for the codebook search. In addition, the ACELP technique separately codes the pulses in the respective subgroups before transmission, thereby preventing interference between the pulses in different subgroups. As a result, although a channel error occurs in several bits during transmission, the channel error affects only the pulses in the same subgroup and does not affect the pulses in the other subgroups. Thus, the ACELP technique is less susceptible to the channel environment. Compared with the ACELP technique, an LD-CELP (Low-Delay Code Excited Linear Predictive coding) technique using a stochastic codebook is susceptible to the channel error, since even a single-bit error of a codebook index affects the overall excitation signal.

A process of searching a fixed codebook for a code vector by the CELP coding in order to search for an excitation signal will now be described herein below.

The EFR or EVRC, a conventional ACELP technique, performs the code vector search process by segmenting an excitation signal with L samples into several subgroups and then searching for positions and amplitudes of a predetermined number of pulses in each subgroup in order to reduce calculations and secure insusceptibility to the channel environment. For example, as illustrated in Table 1, the EFR segments an excitation signal with L (=40) samples into 5 subgroups each having 8 samples, and searches for positions and amplitudes of a total of 10 pulses by searching for positions and amplitudes of 2 pulses in each subgroup. The positions of the pulses in the each subgroup are coded with 6 bits (i.e., 3 bits for each pulse), and the amplitudes of the pulses in each subgroup are fixed to "+1" or "−1". Here, a sign of 2 pulses in each subgroup is coded with 1 bit. As a result, an excitation signal is coded with a total of 35 bits (i.e., 7 bits for each subgroup). Whether amplitude of the pulses is "+1" or "−1" is calculated by referring to a residual of the linear prediction filter and a residual of the pitch filter in the positions of the respective pulses.

TABLE 1

| Subgroup | Positions |
|---|---|
| 0 | 0, 5, 10, 15, 20, 25, 30, 35 |
| 1 | 1, 6, 11, 16, 21, 26, 31, 36 |
| 2 | 2, 7, 12, 17, 22, 27, 32, 37 |
| 3 | 3, 8, 13, 18, 23, 28, 33, 42 |
| 4 | 4, 9, 14, 19, 24, 29, 34, 43 |

For the positions of the excitation pulses, it is necessary to search for a pulse position where an error, for which weighting between reference speech and synthetic speed obtained by passing positions and amplitudes of the possible pulses through a synthesis filter is taken into consideration, becomes minimized. When all of the pulse positions are taken into consideration, the number of searches becomes too large even on the assumption that the excitation signal is segmented into 5 subgroups and there are only 2 pulses in each subgroup. Therefore, the EFR uses the following suboptimal method.

It will be assumed herein that the 10 pulse positions to be searched for are $(m_0, m_1, \ldots, m_9)$. First, one pulse position is previously searched for in each of 5 tracks (subgroups). $m_0$ will be situated in a position of a selected one of the 5 pulses and survive to the very end. Next, the repetitive operation is performed four times. In each repetitive operation, $m_1$ is fixed to the previously searched pulse position in the remaining 4 tracks. The remaining 8 pulses are searched for in pairs of $(m_2,m_3)$, $(m_4,m_5)$, $(m_6,m_7)$, and $(m_8,m_9)$, respectively. At each repetition, the start points, of the 9 pulses are shifted in a circle. Therefore, the pulse pairs have different track combinations every repetition period. As a result, 2 of the 10 searched pulses belong to the 5 previously searched pulses.

It should be noted herein that the applicant is interested in the fact that the EFR does not consider the effects of the remaining pulses $m_4, m_5, \ldots, m_9$ when searching for positions of the pulses $(m_2,m_3)$. The calculation is performed in this way, because the pulses $m_4, m_5, \ldots, m_9$ were not searched for yet while searching for the pulses $(m_2,m_3)$. However, whether this assumption is reasonable is uncertain. Instead, there is possibility that presuming even the remaining pulse positions will attain more reasonable results.

As described above, the conventional ACELP technique uses a method of searching for the positions and amplitudes of the pulses by stages. This method, however, increases calculations, so it is not possible to securely search for a code vector having a higher cost function value than the previously searched code vector, although the codebook is searched in various ways.

SUMMARY OF THE INVENTION

It is, therefore, an object of the present invention to provide a new codebook search method distinguishable from the conventional ACELP codebook search method, in order to resolve the problems of the ACELP codebook search.

It is another object of the present invention to provide a codebook search method with improved coding performance in a speech coding system.

To achieve the above and other objects, the present invention provides a new codebook search method. The codebook search method first searches for positions and amplitudes of a desired number of initial pulses, and then repeatedly exchanges the positions of or the positions and amplitudes of a predetermined number of pulses, thereby updating positions of new pulses. A cost function value calculated by the new codebook search method shows better results compared with the cost function value calculated by the conventional ACELP technique, resulting in an improvement in speech quality of a vocoder.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
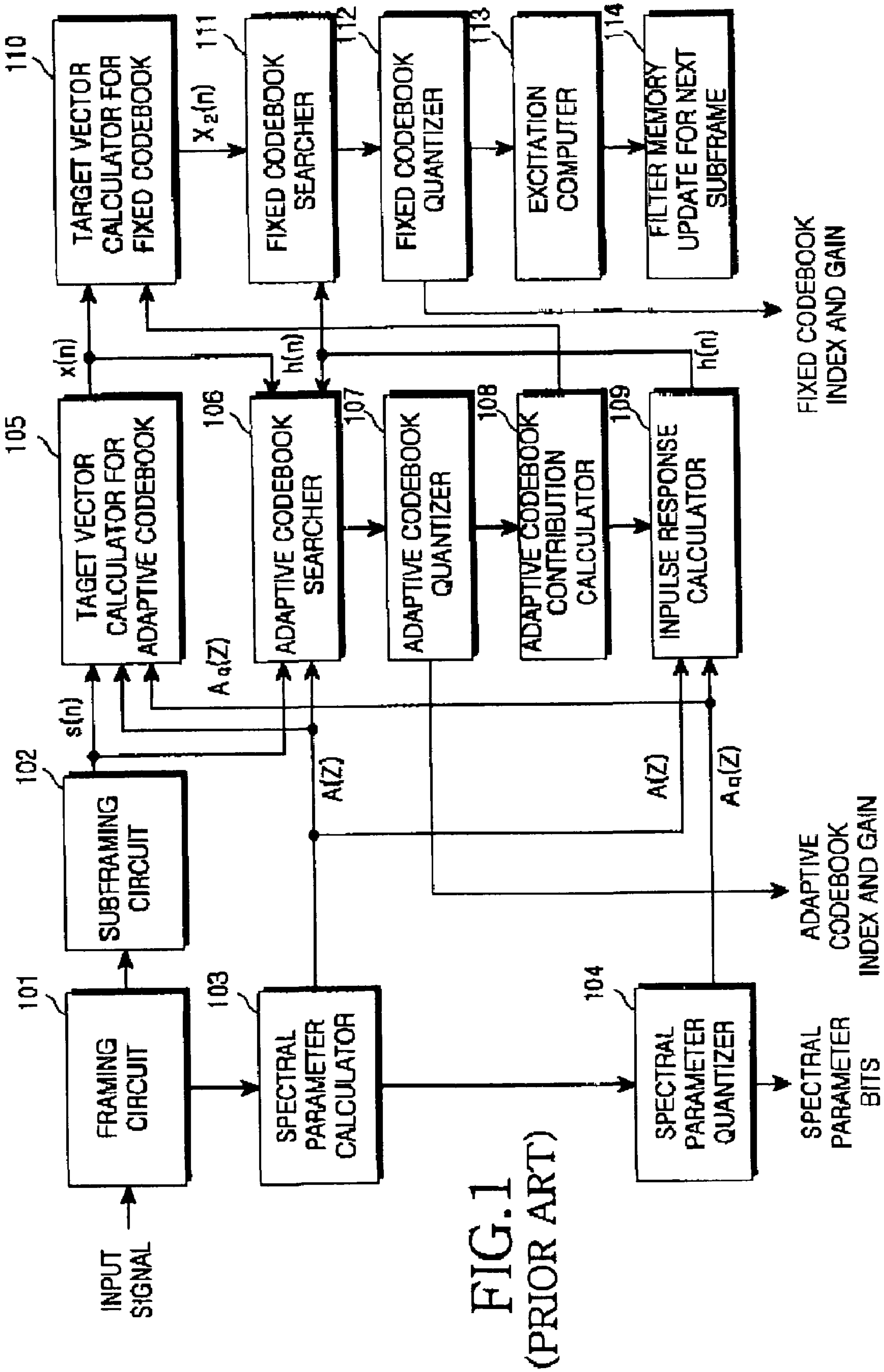
FIG.1 (PRIOR ART)
FIG. 1 illustrates a block diagram of a conventional speech coding system to which the present invention is applied.

A preferred embodiment of the present invention will be described herein below with reference to the accompanying drawings. In the following description, well-known functions or constructions are not described in detail since they would obscure the invention in unnecessary detail.

In the following description, the present invention provides a method for searching an excitation (or fixed) codebook in a speech coding system. First, a description will be made of a speech coding system to which the present invention is applied, and an operation of coding a speech signal using the ACELP technique in the system. Next, the conventional ACELP technique will be described in brief. Thereafter, an ACELP technique according to an embodiment of the present invention will be described.

In order to reduce calculations, the known ACELP technique segments an excitation signal into several subgroups (or tracks) and searches an excitation codebook on the assumption that there are several non-zero pulses in each subgroup. A process of searching the codebook is performed by making synthetic speech using an excitation signal comprised of given pulses, comparing the synthetic speech with reference speech, and then selecting the nearest excitation signal according to the comparison. In searching for a given number $N_p$ of pulses, the conventional excitation codebook search method repeats the process of searching for the pulses in stages instead of searching for the $N_p$ pulses at once. That is, the conventional method first searches one pulse having the minimum error by comparing the speech synthesized by the one pulse with target speech, on the presumption that the remaining pulses do not exist. Next, to search for one more pulse, the conventional method generates synthetic speech by synthesizing the previously searched pulse with another pulse, and finds the nearest pulse by comparing the synthetic speech with target speech. This pulse becomes a second pulse. In this manner, the conventional method completely searches for a predetermined number $N_p$ of pulses, e.g., 10 pulses. Of course, the conventional method can search for the pulses by 2, not by 1.

The present invention improves the conventional codebook search process. First, the improved codebook search process searches for positions and amplitudes of a predetermined number of initial pulses. Next, the improved codebook search process selects a combination of pulses to be exchanged among the searched initial pulses and then generates synthetic speech while exchanging the pulses in the selected pulse combination into a combination of other pulses and leaving the remaining pulses. Thereafter, the improved codebook search process compares the generated synthetic speed with target speech, searches for a combination of the pulses having the minimum error there between, and substitutes the selected pulse combination for the searched pulse combination. By doing so, it is possible to securely search for better pulses each time the pulses are exchanged, thus generating an excitation signal whose performance is improved in stages.

The speech coding method according to the present invention includes a section for generating an excitation signal by coding a given speech signal, and another section for calculating a coefficient for a linear prediction filter in order to generate synthetic speech from the excitation signal. A known method can be used in calculating a coefficient of the linear prediction filter. The present invention provides a method for generating an excitation signal. The excitation signal is generated by segmenting a subframe into a predetermined number of subgroups, and searching for a predetermined number of pulses in each subgroup. The section for generating the excitation signal is comprised of a section for searching for positions and amplitudes of a predetermined number of initial pulses, and another section for exchanging positions of or positions and amplitudes of a predetermined number of pulses among the searched initial pulses.

An operation according to an embodiment of the present invention is performed in a speech coding system illustrated in FIG. 1. FIG. 1 illustrates a block diagram of a general speech coding system to which the present invention is applied. Specifically, FIG. 1 illustrates a structure of a CELP coding system.

In FIG. 1, speech suppression is performed by (i) calculating a linear prediction filter's coefficient representing a formant spectrum by receiving an input speech signal and segmenting the received speech signal into frames in a preset unit (e.g., 10–40 ms), (ii) calculating adaptive codebook index and gain by segmenting one frame into several pitch subframes, and (iii) calculating fixed codebook index and gain by segmenting one frame into several excitation subframes. In general, the number of samples of the excitation subframe used to calculate the fixed codebook index is less than the number of samples of the pitch subframe used to calculate the adaptive codebook index and gain. If the speech coding system codes and transmits information on the adaptive codebook index and gain, information on the spectrum parameter represented by the linear prediction filter, and information on the fixed codebook index and gain, then a decoder synthesizes the speech again using the above information. Table 2 defines symbols used in the following description.

TABLE 2

| | |
|---|---|
| A(z): | The inverse filter with unquantized coefficients |
| $a_i$: | The unquantized linear prediction parameters (direct form coefficients) |
| 1/B(z): | The long-term synthesis filter |
| H(z): | The speech synthesis filter with quantized coefficients |
| W(z): | The perceptual weighting filter (unquantized coefficients) |
| γ1, γ2: | The perceptual weighting factors |
| h(n): | The impulse response of the weighted synthesis filter |
| x(n): | The target signal for adaptive codebook search |
| $x_2(n)$, $x^t_2$: | The target signal for algebraic codebook search |
| H: | The lower triangular Toepliz convolution matrix with diagonal h(0) and lower diagonals h(1), K, h(39) |
| $\Phi = H^tH$: | The matrix of correlations of h(n) |
| d(n): | The elements of the vector d |
| Φ(i, j): | The elements of the symmetric matrix Φ |
| $m_i$: | The position of the $i^{th}$ pulse |
| $\vartheta_i$: | The amplitude of the $i^{th}$ pulse |
| $res_{LTP}(n)$: | The normalized long-term prediction residual |
| $s_b(n)$: | The sign signal for the algebraic codebook search |
| d'(n): | Sign extended backward filtered target |
| Φ(i, j): | The modified elements of the matrix Φ, including sign information |
| c: | code vector |

Referring to FIG. 1, upon receiving a speech or audio signal, a framing circuit 101 segments the received signal into several frames. For each of the frames, a spectral parameter calculator 103 calculates a spectrum parameter (or LPC (Linear Predictive Coding) parameter) indicating formant information. The spectrum parameter is defined as an LPC filter A(z), given in Equation (1). The LPC parameter can be calculated referring to "Linear Prediction of Speech", Springer Verlag (1976) by J. D. Markel and A. H. Gray.

$$A(z) = 1 + \sum_{i=1}^{P} a_i z^{-i} \tag{1}$$

In Equation (1), $a_0=1$ and z represents a variable of the polynomial A(z).

The spectrum parameter calculated by the spectral parameter calculator 103 is quantized by a spectral parameter quantizer 104. A subframing circuit 102 segments each of the frames output from the framing circuit 101 into several subframes. A target vector calculator (for adaptive codebook) 105 calculates a target vector for the adaptive codebook. An adaptive codebook searcher 106 calculates adaptive codebook index and gain, and an adaptive codebook quantizer 107 quantizes the calculated adaptive codebook index and gain. The adaptive codebook index and gain are calculated by the adaptive codebook searcher 106 using a signal determined by subtracting a zero response output from a weighted synthesis filter (not shown) from an output signal of a perceptually weighted filter (not shown). The adaptive codebook index and gain are represented by a delay T and a gain $g_P$ of the pitch filter, respectively, as given in Equation (2). Here, the pitch filter is for modeling a pitch period of a speech signal.

$$B(z)=1-g_P z^{-T} \tag{2}$$

A perceptual weighting filter W(z) for perceptual weighting and a weighted synthesis filter H(z) are calculated from the LPC filter A(z), as shown in Equations (3) and (4), respectively.

$$W(z) = \frac{A(z/\gamma_1)}{A(z/\gamma_2)},\ 0 < \gamma_2 < \gamma_1 \le 1 \tag{3}$$

where A(z) indicates an LPC filter with unquantized coefficients, and γ1 and γ2 indicate perceptual weighting factors.

$$H(z)=W(z)/A(z) \tag{4}$$

If a signal vector determined by excluding a contribution component by the adaptive codebook and a zero response component from the input signal is an L-sample vector $x_2^T=\{x_2(0), x_2(1), \ldots, x_2(L-1)\}$, the fixed codebook search process is performed by the fixed codebook searcher 111 illustrated in FIG. 1, as follows. Here, L indicates amplitude of a subframe for the fixed codebook search. A target vector $x_2(n)$ is applied to the fixed codebook searcher 111. The target vector $x_2(n)$ is calculated by a target vector calculator (for fixed codebook) 110. The target vector calculator 110 receives the target vector x(n) calculated by the target vector calculator 105 and an adaptive codebook contribution component calculated by an adaptive codebook contribution calculator 108, and calculates the target vector $x_2(n)$. An impulse response calculator 109 receives the spectral parameter A(Z) calculated by the spectral parameter calculator 103 and a quantized spectral parameter $A_q(Z)$ calculated by the spectral parameter quantizer 104, and calculates an impulse response h(n). The fixed codebook searcher 111 receives the target vector $x_2(n)$ calculated by the target vector calculator 110 and the impulse response h(n), and calculates the fixed codebook. This fixed codebook search process will be described in detail herein below. A fixed codebook quantizer 112 quantizes the search result of the fixed codebook searcher 111, and outputs a fixed codebook index and gain.

An excitation computer 113 receives and computes the quantization result by the fixed codebook quantizer 112, and outputs an excitation signal. A filter memory 114 receives and stores the output result from the excitation computer 113 for update of next subframe. A process of searching for an excitation signal is a process of calculating a vector $c_k$ and a gain $g_c$ such that an error, for which perceptual weighting between reference speech and synthetic speed obtained by passing possible code vectors made by a combination of pulses through a synthesis filter is taken into consideration, becomes minimized.

$$E_P=\|x_2-g_cHc\|^2,\ g_c>0,\ c\text{:code vector of dimention L} \tag{5}$$

A target vector $x_2$, as mentioned above, is a signal vector calculated by subtracting (i) synthetic speech determined by passing an input signal previously calculated from the adaptive codebook through a synthesis filter W(z)/A(z) and (ii) a zero input response of the synthesis filter from a signal obtained by passing original speech through a perceptual weighting filter W(z). H is a filter matrix made by shifting an impulse response h(n) of the synthesis filter expressed as a weighted synthesis filter W(z)/A(z) on a sample-by-sample basis. In order improve the speech quality at a high pitch, a periodic concept is introduced to the fixed codebook by modifying the impulse response h(n) into $h(n)=h(n)+g_Ph(h-T)$, n=T, . . . , L−1, where $g_P$ indicates a gain of the pitch filter and T indicates an integer component of a delay of the pitch filter.

$$H=\begin{bmatrix} h(0) & 0 & 0 & \cdots & 0 & 0 & 0 & 0 \\ h(1) & h(0) & 0 & 0 & \cdots & 0 & 0 & 0 \\ h(2) & h(1) & h(0) & 0 & 0 & \cdots & 0 & 0 \\ \vdots & \vdots & \vdots & \vdots & \vdots & \vdots & \vdots & \vdots \\ h(L-1) & h(L-2) & \cdots & \cdots & \cdots & \cdots & \cdots & h(0) \end{bmatrix} \tag{6}$$

A gain g minimizing the gain $g_c$ in Equation (5) is represented by Equation (7), and if this value is substituted into Equation (5), $E_P$ can be rewritten as Equation (8).

$$g=\frac{x_2^THc}{\|Hc\|^2} \tag{7}$$

$$E_P=\|x_2\|^2-\frac{\|x_2^THc\|^2}{\|Hc\|^2} \tag{8}$$

It is possible to calculate a code vector c, which minimizes $E_P$ of Equation (8). Also, it is possible to calculate the gain g using this code vector c. In order to minimize $E_P$ of Equation (8), it is necessary to maximize the second term of Equation (8). Therefore, it is necessary to first calculate a code vector $c=c_{opt}$ for maximizing the second term.

$$J=\frac{(C)^2}{E_D}=\frac{(d^Tc)^2}{c^T\Phi c} \tag{9}$$

If it is assumed that the second term of Equation (8) by the code vector c is a cost function J of Equation (9), a fixed codebook search process by an perceptual weighted mean square error searches for a code vector $c=c_{opt}$ where the cost function J becomes maximized. Here, $d=H^Tx_2$ is a cross-correlation matrix of a target function $x_2$ and an impulse response H in a perceptual domain. A cross-correlation function vector $d^T=[d(0),d(1),d(2), \ldots, d(L-1)]$ of Equation (10) and a matrix $\Phi=H^TH$ of Equation (11) are previously calculated before the codebook search.

$$d(n)=\sum_{i=n}^{L-1}x(n)h(i-n),\ n=0,\ \ldots,\ L-1 \tag{10}$$

$$\phi(i,j)=\sum_{n=j}^{L-1}h(n-i)h(n-j),\ (j\geq i) \tag{11}$$

Generally, in calculating a global optimal code vector where the cost function J becomes maximized, too many calculations are required. Therefore, the code vector is calculated on several conditions given. First, it is assumed that when an excitation signal is segmented into several subgroups, there are a predetermined number of pulses with non-zero amplitude in each subgroup, as in the conventional ACELP. On this assumption, a correlation C, a numerator of Equation (9), can be expressed by $$C(m_0,m_1,\ldots,m_{N_P-1},\vartheta_0,\vartheta_1,\ldots,\vartheta_{N_P-1})=\sum_{i=0}^{N_P-1}\vartheta_i d(m_i) \tag{12}$$

where $m_i$ represents a position of an $i^{th}$ pulse, and $\theta_i$ represents amplitude of an $i^{th}$ pulse.

Energy $E_p$, a denominator of Equation (9), can be represented by $$E_D(m_0,m_1,\ldots,m_{N_P-1},\vartheta_0,\vartheta_1,\ldots,\vartheta_{N_P-1})=\sum_{i=0}^{N_P-1}\phi(m_i,m_i)+2\sum_{i=0}^{N_P-1}\sum_{j=i+1}^{N_P-2}\vartheta_i\vartheta_j\phi(m_i,m_j) \tag{13}$$

In the speech coding system, the conventional ACELP technique is performed using the method of searching for positions and amplitudes of the pulses by stages. In the case of the EFR, the amplitude is fixed to "−1" or "+1" at each pulse position. 2 of the given 5 pulse positions are fixed, and the remaining 8 pulse positions are searched for in the following manner. If 2 pulses selected from the 5 given pulses are $(i_0,i_1)$, another 2-pulse combination $(m_2,m_3)$ becomes $(m_2,m_3)=(i_2,i_3)$ where the cost function $J=(C)^2/E_D$ calculated by $(i_0,i_1,m_2,m_3)$ becomes maximized. The next pulse combination $(m_4,m_5)$ becomes $(m_4,m_5)=(i_4,i_5)$ where the cost function $J=(C)^2/E_D$ calculated by $(i_0,i_1,i_2,i_3,m_4,m_5)$ becomes maximized. It is possible to search for a predetermined number of pulses, e.g., 10 pulses by repeating the above process of selecting 2 pulses from 5 given pulses 4 times and searching for pulse positions having the best performance while exchanging the selected 2 pulses and other 2 pulse combinations.

However, when the pulses of $m_2$ to $m_9$ are searched for in the 4 repeated processes, it is also possible to search for a pulse position in the next repetition period on the basis of a pulse position obtained in the first repetition period. To be specific, if the pluses calculated in the first repetition period are $(m_0,m_2, \ldots ,m_9)=(i_0,i_2, \ldots , i_9)$, it is preferable to search for $(m_2,m_3)=(i_2',i_3')$, where synthetic speech synthesized by a combination $(i_0,i_1,i_2,i_3,i_4,i_5,i_6,i_7,i_8,i_9)$ among all the possible combinations of pulses $(m_2,m_3)$ becomes nearest to the target speech, under the consumption that the pulses searched for in the first repetition period exist in the respective tracks, instead of disregarding the effects of the pulses $i_0$, $i_2$, $i_3$, $i_4$, $i_5$, $i_6$, $i_7$, $i_8$ and $i_9$. This is because it is assured that the newly searched pulse positions $(i_2',i_3')$ provide better results (performance) than the previous pulse positions $(i_2,i_3)$. The applicant has implemented the excitation codebook search process according to an embodiment of the present invention based on this fact.

Figure 2:
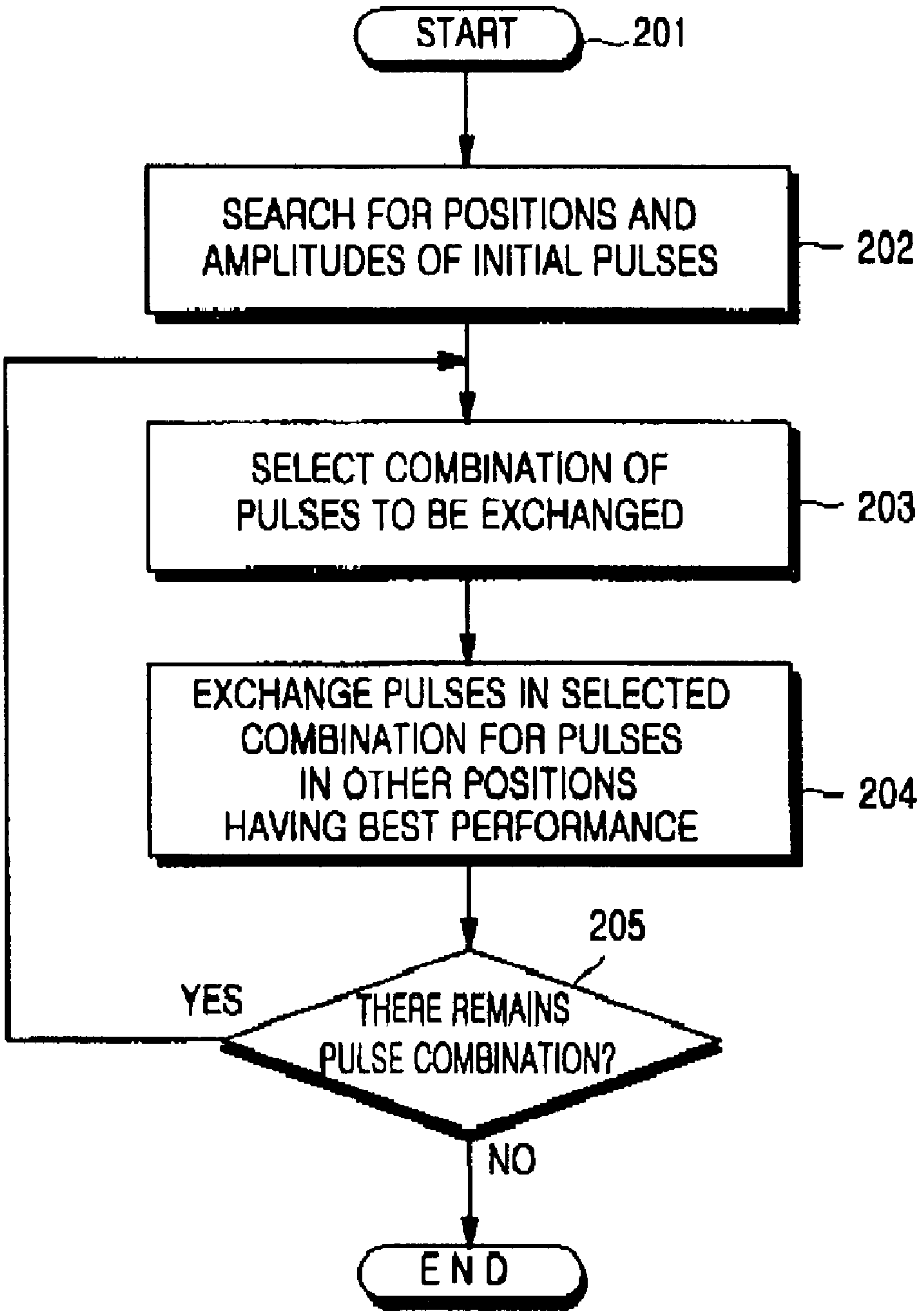
FIG. 2 illustrates a procedure for performing an excitation codebook search operation according to a first embodiment of the present invention.

FIG. 2 illustrates a procedure for performing an excitation codebook search operation according to an embodiment of the present invention. A fixed codebook searcher 111 illustrated in FIG. 1 performs such a codebook search operation.

Referring to FIG. 2, after starting the codebook search process in step 201, the fixed codebook searcher 111 finds the positions and amplitudes of initial pulses in step 202, and selects a combination of pulses to be exchanged in step 203. Thereafter, in step 204, the fixed codebook searcher 111 exchange the pulses in the selected pulse combination for the pulses in other positions in a specific subgroup. The specific subgroup is a subgroup to which the pulses, where an error between the synthetic speech synthesized by the selected pulse combination and the original (or reference) speech becomes minimized, belong. The fixed codebook searcher 111 repeats steps 203 and 204 until it is determined in step 205 that there remains no more combination of pulses to be exchanged. A codebook search process using the perceptual weighted mean square error due to an error between the synthetic speech and the original speech is performed as follows.

(1) Positions and amplitudes of $N_p$ initial pulses in a subframe are searched for.

(2) C and $E_D$ for the searched positions and amplitudes of the initial pulses are calculated in accordance with Equations (12) and (13).

(3) The following processes (3-1) to (3-4) are repeatedly performed and the searched amplitudes and positions of the pulses are exchanged accordingly.

(3-1) A combination of pulses to be exchanged is selected from the $N_p$ initial pulses.

(3-2) A contribution component by the combination of the selected pulses is subtracted from the calculated C and $E_D$.

(3-3) C and $E_D$ are calculated when the pulses in each combination are exchanged for the positions and amplitudes of other pulses in a subgroup to which the pulses belong.

(3-4) A pulse combination where the cost function value $J=(C)^2/E_D$ becomes maximized is calculated, and this is exchanged for the positions and amplitudes of the pulses in the corresponding combination.

If the positions and amplitudes of the initial pulses are $(i_0,i_1, \ldots ,i_{N_p-1},A_0,A_1, \ldots ,A_{N_p-1})$ and a combination of positions and amplitudes of pulses to be exchanged is $(i_1,i_2,A_1,A_2)$ having positions and amplitudes of two pulses, the processes (3-2), (3-3) and (3-4) are performed as follows.

$C(i_0,i_3, \ldots ,i_{N_p-1},A_0,A_3, \ldots ,A_{N_p-1})$ and $E_D(i_0,i_3, \ldots , i_{N_p-1},A_0,A_3, \ldots ,A_{N_p-1})$ are calculated by subtracting a contribution component by $(i_1,i_2,A_1,A_2)$ from $C(i_0,i_1, \ldots , i_{N_p-1},A_0,A_1, \ldots ,A_{N_p-1})$. Then, $(m_1,m_2,\theta_1,\theta_2)=(i_1',i_2',A_1',A_2')$ where the cost function $J=(C)^2/E_D$ becomes maximized is searched for by calculating $E_D(i_0,m_1,m_2 \ldots ,i_{N_p-1},A_0,\theta_1,\theta_2,A_3, \ldots ,A_{N_p-1})$ and $C(i_0,m_1,m_2 \ldots ,i_{N_p-1},A_0,\theta_1,\theta_2, A_3, \ldots ,A_{N_p-1})$ for every case of the combination $(m_1,m_2,\theta_1,\theta_2)$ of the pulses having different positions and amplitudes in the subgroup to which the pulses $i_1$ and $i_2$ in the selected combination belong. In this manner, the existing $(i_1,i_2,A_1,A_2)$ is substituted for the newly calculated $(i_1',i_2',A_1',A_2')$. As a result, the cost function $J=(C)^2/E_D$ becomes larger than before the substitution, thus making it possible to calculate more optimal pulse positions and amplitudes.

Although the foregoing description has been made with reference to when the combination of the pulses to be exchanged has two positions and amplitudes, the number of pulse positions and amplitudes is extensible. It is noted from the foregoing description that the calculations and performance depend on how to search for the positions and amplitudes of the initial pulses and how to make the combination of pulses to be exchanged.

Figure 3:
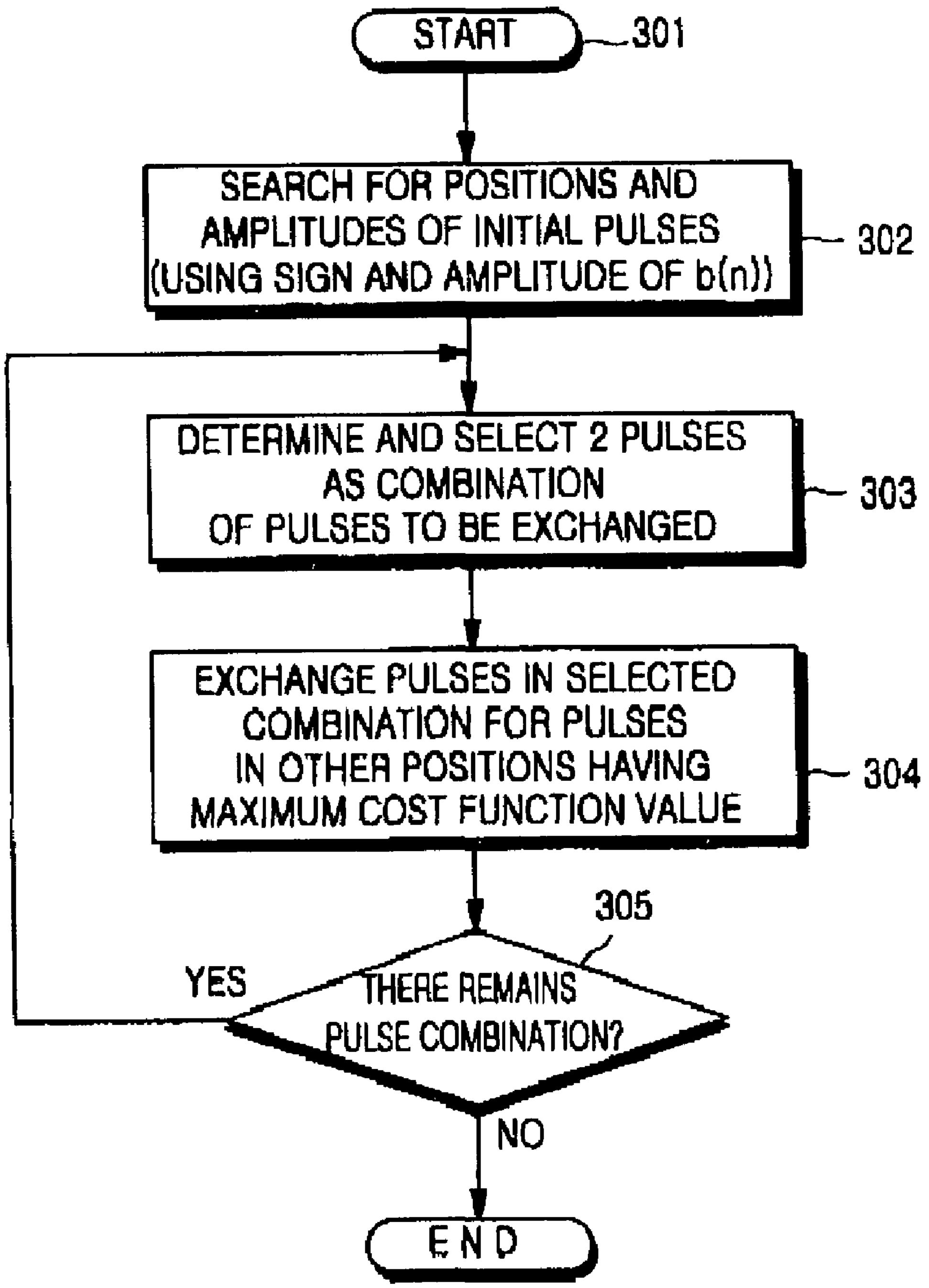
FIG. 3 illustrates a procedure for performing an excitation codebook search operation according to a second embodiment of the present invention.
Figure 4:
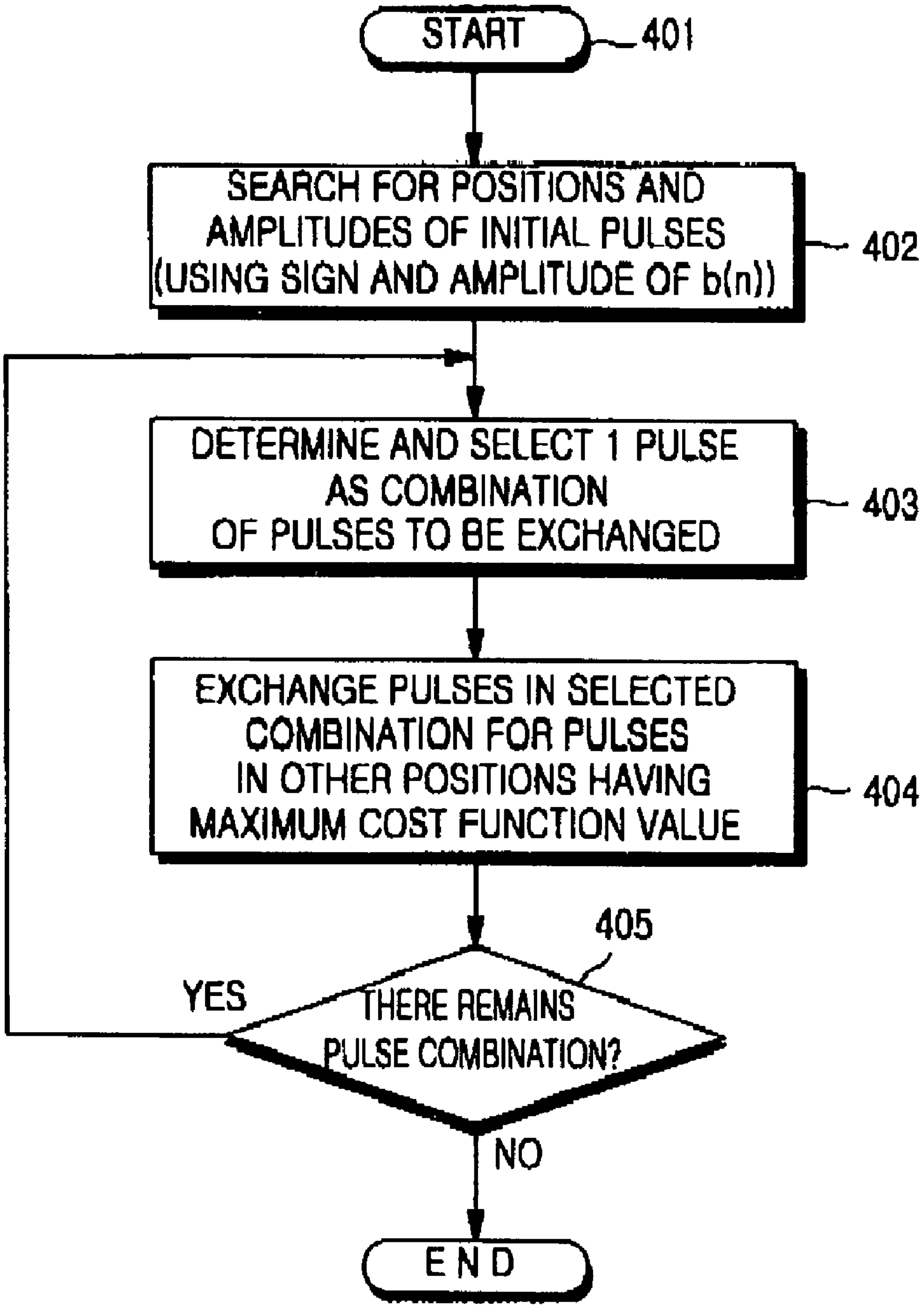
FIG. 4 illustrates a procedure for performing an excitation codebook search operation according to a third embodiment of the present invention.
Figure 5:
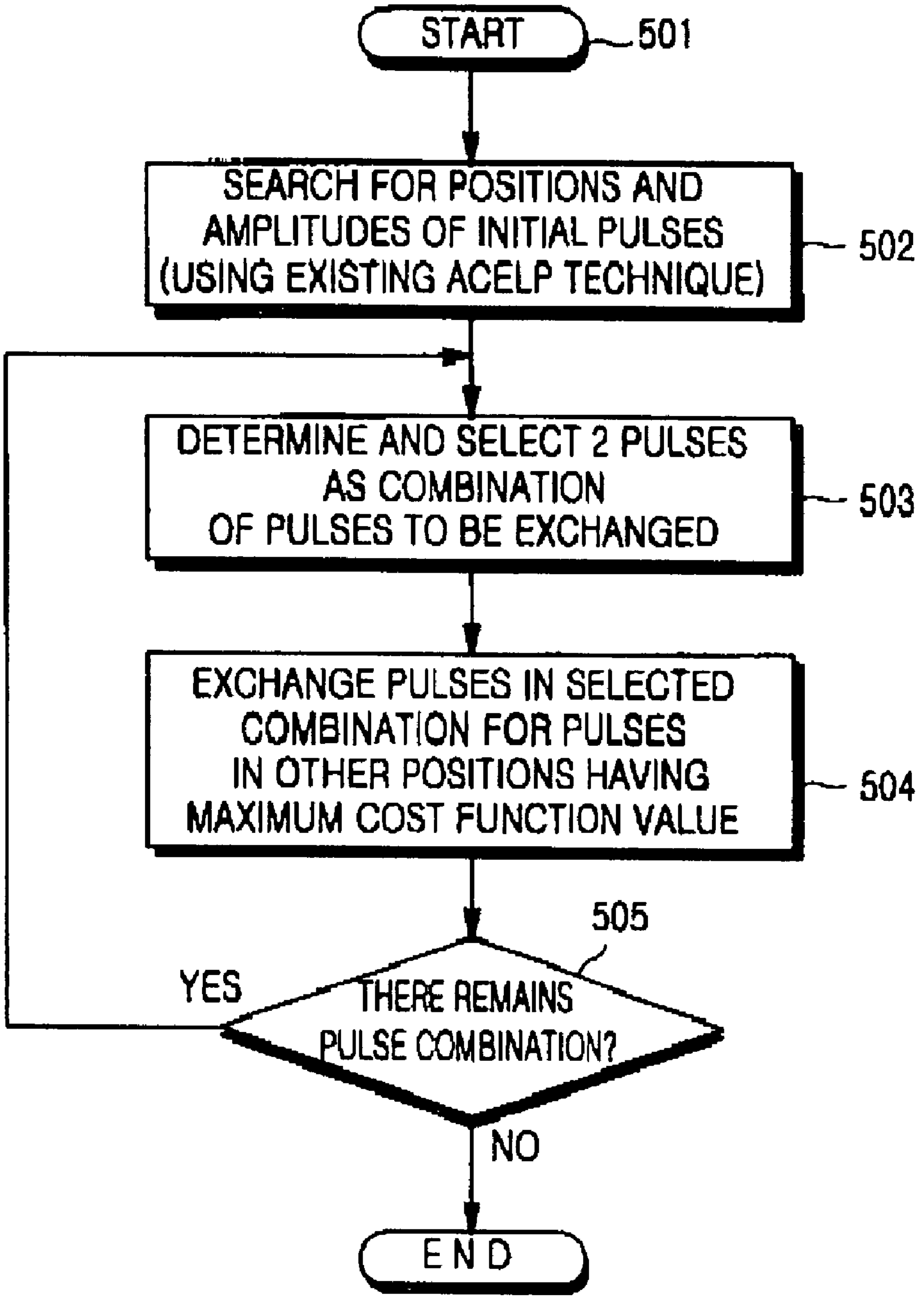
FIG. 5 illustrates a procedure for performing an excitation codebook search operation according to a fourth embodiment of the present invention.

In the following description, the fixed (excitation) codebook search operation according to the embodiment of the present invention is performed by the fixed codebook searcher 111 illustrated FIG. 1, as mentioned above. In order to generate an excitation signal to be used in the synthesis filter for synthesizing a speech signal, the fixed codebook searcher 111 segments a speech signal frame into a plurality of subframes, segments each subframe into a plurality of subgroups, and searches each subframe comprised of a plurality of pulse position/amplitude combinations for pulses. The fixed codebook searcher 111 performs the codebook search operation according to the methods described in Embodiment #1 to Embodiment #4 below. The codebook search operation according to Embodiment #1 to Embodiment #4 is illustrated in FIG. 3 to FIG. 5, respectively. The embodiments are classified according to how to determine the positions and amplitudes of the initial pulses and how to determine the combination of the pulses to be exchanged. Embodiment #1 searches for the positions and amplitudes of the initial pulses using Equation (14) below, and sets the number of pulses to be exchanged to 2. Embodiment #2 searches for the positions and amplitudes of the initial pulses using Equation (14), and sets the number of pulses to be exchanged to 1. Embodiment #3 searches for the positions and amplitudes of the initial pulses according to the existing ACELP technique, and sets the number of pulses to be exchanged to 2.

Embodiment #1

When the number of pluses to be searched for is $N_p=10$ and an amplitude of the subframe is L=40, if the subframe is segmented into 5 subgroups, there are 2 pulses with non-zero amplitude in each subgroup.

In the first embodiment of the present invention, the fixed codebook searcher 111 searches for the positions and amplitudes of the initial pulses using sign and amplitude of b(n) represented by Equation (14) (Steps 301 and 302 in FIG. 3).

$$b(n) = \beta\frac{res_{LTP}(n)}{\sqrt{\sum_{i=0}^{L-1} res_{LTP}(i)res_{LTP}(i)}} + (1-\beta)\frac{d(n)}{\sqrt{\sum_{i=0}^{L-1} d(i)d(i)}}, \quad n = 0, \ldots , L-1 \tag{14}$$

In Equation (14), β is a certain value between 0 and 1, and $res_{LTP}(n)$ is a residual signal determined by excluding a pitch component from an LPC residual signal. The positions of the initial pulses are set to two pulse positions having a larger absolute value of b(n) in each subgroup. The amplitudes of the initial pulses are fixed to "+1" or "−1" according to a sign of b(n) in respective pulse positions. The value of b(n)

represented by Equation (14) is the sum of a normalized d(n) vector and a normalized prediction residual signal, and specified in "3G TS 26.090 V3.1.0" of the 3GPP ($3^{rd}$ Generation Partnership Project). It is possible to reduce calculations by utilizing the method of previously determining amplitudes of all pulses using b(n) and then searching codebook.

As described above, in the first embodiment of the present invention, the fixed codebook searcher 111 determines the positions and amplitudes of the initial pulses using the b(n).

Next, the fixed codebook searcher 111 determines whether a combination of the pulses to be exchanged has 2 pulses (Step 303). If a sign of b(n) in an $n^{th}$ pulse position is $s_b(n)$, Equations (12) and (13) are rewritten as $C(m_0,m_1, \ldots, m_{N_p-1})$ and $E_D(m_0,m_1, \ldots, m_{N_p-1})$ of Equations (15) and (16), respectively, using $d'(n)=d(n)s_b(n)$ and $\phi'(i,j)=\phi(i,j)s_b(i)s_b(j)$.

$$C(m_0, m_1, \ldots, m_{N_p-1}) = \sum_{i=0}^{N_p-1} d'(m_i) \quad (15)$$

$$E_D(m_0, m_1, \ldots, m_{N_p-1}) = \sum_{i=0}^{N_p-1} \phi'(m_i, m_i) + \sum_{i=0}^{N_p-2} \sum_{j=i+1}^{N_p-1} \phi'(m_i, m_j) \quad (16)$$

If the positions of the initial pulses are $(m_0,m_1, \ldots, m_9)=(i_0,i_1, \ldots, i_9)$ and a combination of pulses to be exchanged is $(i_0,i_1)$, then the fixed codebook searcher 111 calculates $C(i_2,i_3, \ldots, i_9)$ and $E_D(i_2,i_3, \ldots, i_9)$ by excluding a contribution component by the pulse combination $(i_0,i_1)$ from $C(i_0,i_1, \ldots, i_9)$ and $E_D(i_0,i_1, \ldots, i_9)$. Thereafter, the fixed codebook searcher 111 calculates $C(m_0,m_1,i_2,i_3, \ldots, i_9)$ and $E_D(m_0,m_1,i_2,i_3, \ldots, i_9)$ for every pulse combination $(m_0,m_1)$ of the subgroup to which a pulse $i_0$ belong and the subgroup to which a pulse $i_1$ belongs, searches for $(m_0,m_1)=(i_0',i_1')$ where the cost function $J=(C)^2/E_D$ becomes maximized, and substitutes them for the existing $(i_0,i_1)$_(Step 304). As a result, a value of the cost function J is increased compared with the exiting value, making it possible to search for positions of the pulses having better performance.

After calculating 10 pulses of all the combinations $(i_0,i_1)$, $(i_2,i_3)$, $(i_4,i_5)$, $(i_6,i_7)$ and $(i_8,i_9)$ in this manner, the fixed codebook searcher 111 newly searches for pulses of $(i_1,i_2)$, $(i_3,i_4)$, $(i_5,i_6)$, $(i_7,i_8)$ and $(i_9,i_0)$ by changing the pulse combinations(Step 305, YES→Step 303→Step 304). Each time the fixed codebook searcher 111 searches for the new pulse positions, the cost function value J becomes equal to or better than that of the previous pulses. Therefore, as the fixed codebook searcher 111 repeats this process while changing the pulse combinations, the cost function value J converges into a certain value.

Embodiment #2

In the second embodiment, the fixed codebook searcher 111 first searches for positions and amplitudes of a total of 10 pulses by searching for positions and amplitudes of 2 pulses with higher absolute values of b(n) in each subgroup (Steps 401 and 402 in FIG. 4). Next, the fixed codebook searcher 111 searches for positions and amplitudes of other pulses where an increment of the cost function $J=(C)^2/E_D$ becomes maximized, while exchanging the positions and amplitudes of each of the 10 pulses, and determines the searched values as the positions and amplitudes of the initial pulses. Thereafter, the fixed codebook searcher 111 determines that the combination of the pulses to be exchanged has 1 pulse, and exchanges the positions and amplitudes of the initial pulses (Steps 403~405). In performing an operation of exchanging the positions and amplitudes of the initial pulses, the fixed codebook searcher 111 sorts the positions of the initial pulses in a descending order of a contribution to the cost function J, and exchanges the pulses with a lower contribution component, thereby searching for the pulse positions having better performance. The fixed codebook searcher 111 can also obtain the same results by sorting the 10 pulses by exchanging the position and amplitude of one pulse among the 10 unsorted pulses, instead of sorting the 10 pulses calculated from b(n).

Embodiment #3

Unlike the first and second embodiments, the third embodiment searches for positions and amplitudes of the initial pulses using the existing ACELP technique, instead of searching for the positions and amplitudes of the initial pulses from b(n). In this embodiment, the fixed codebook searcher 111 calculates $C(m_0,\theta_0)$ and $E_D(m_0,\theta_0)$ for all the possible positions and amplitudes $(m_0,\theta_0)$ for one pulse. The fixed codebook searcher 111 determines $(m_0,\theta_0)=(i_0,A_0)$ where the cost function $J=(C)^2/E_D$ calculated from the results becomes maximized as position and amplitude of the first pulse. Next, the fixed codebook searcher 111 adds positions and amplitudes $(m_1, \theta_1)$ of the second pulse on condition that the respective subgroups have the same number of pulses, and then calculates $C(i_0,m_1,i_0,\theta_1)$ and $E_D(i_0,m_1,i_0,\theta_1)$ according thereto. The fixed codebook searcher 111 searches for positions and amplitudes of the second pulse by calculating $(m_1,\theta_1)=(i_1,A_1)$ where the cost function $J=(C)^2/E_D$ calculated from the results becomes maximized. The fixed codebook searcher 111 searches for positions and amplitudes of all of the 10 pulses in this manner, and determines them as position and amplitudes of the initial pulses (Steps 501 and 502 in FIG. 5). After determining the positions and amplitudes of the initial pulses, the fixed codebook searcher 111 performs the process of exchanging the positions and amplitudes of the 2 pulses as done in the first embodiment (Steps 503~505).

Embodiment #4

The fourth embodiment of the present invention searches for the positions and amplitudes of the initial pulses as done in the other embodiments, and performs the process (3) on the respective embodiments, thereby searching for positions and amplitudes of the pulses having best performance. This embodiment generates many combinations of the pulse positions and amplitudes by giving perturbation to the code vector, and calculates a code vector having best performance from the generated combinations.

Meanwhile, it will be understood by those skilled in the art that the number of the pulse positions can be changed to 1 or 3, instead of 2. In addition, the number of the pulses to be searched for is identical to either the number of pulse combinations, or a number determined by dividing the number of pulses by the number of the pulse combinations. For example, when exchanging the positions by making pulse combinations using 10 initial pulses, it is possible to search for the initial pulse positions $i_0$, $i_1$, . . . , and $i_9$ using the combinations $(i_0)$, $(i_1,i_2)$, $(i_3,i_4,i_5)$ and $(i_6,i_7,i_8,i_9)$. Further, in the embodiments, although the pulse amplitude is neither "+1" nor "−1", the invention can be applied in accordance with Equations (4), (7) and (8). There are numerous methods of searching for the positions and amplitudes of the initial pulses in addition to the above 2 examples. Any initialization methods can be applied to the present invention, as long as they include the process of exchanging the better positions and amplitudes of the pulses in the same subgroup.

As aforementioned, the present invention searches the codebook after determining the initial vectors (i.e., positions and amplitudes of the initial pulses), contributing to an increase in possibility of searching for code vectors having better performance, compared with the conventional method. The conventional method cannot guarantee to search for a code vector with higher cost function value than the previously searched code vector, although the codebook is searched in several ways. However, the present invention guarantees to search for a new code vector with better performance than the previous initial code vector. Therefore, when a proper initial code vector is searched for, it is possible to rapidly search for an optimal or sub-optimal code vector. As a result, the present invention properly satisfies the two contradictory demands of reducing calculations and increasing speech quality. Also, it is possible to increase the speech quality by selecting a proper initial code vector.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for segmenting a speech signal frame into a plurality of subframes to generate an excitation signal to be used in a synthesis filter, segmenting each of the plurality of subframes into a plurality of subgroups, and searching the respective subframes each comprised of a plurality of pulse position and amplitude combinations for pulses in a speech coding system including the synthesis filter for synthesizing a speech signal, comprising the steps of:

searching the respective subgroups for positions and amplitudes of $N_p$ pulses with non-zero amplitudes, and generating the searched positions and the amplitudes as an initial vector;

selecting a pulse combination including at least one pulse representing position and amplitude among the pulses of the initial vector; and substituting the pulse position and the amplitude of the selected pulse combination for positions and amplitudes of other pulses in the respective subgroups;

wherein the selecting and substituting steps are repeatedly performed on all the pulses and the amplitudes of the initial vector, and positions and amplitudes of pulses having a maximum cost function value $J=(C)^2/E_D$ calculated by the positions and the amplitudes of the other pulses in the respective subgroups are substituted for the positions and amplitudes of the pulses of the selected pulse combination, where $$C(m_0, m_1, \ldots, m_{N_p-1}, \vartheta_0, \vartheta_1, \ldots, \vartheta_{N_p-1}) = \sum_{i=0}^{N_p-1} \vartheta_i d(m_i)$$

$$E_D(m_0, m_1, \ldots, m_{N_p-1}, \vartheta_0, \vartheta_1, \ldots, \vartheta_{N_p-1}) = \sum_{i=0}^{N_p-1} \phi(m_i, m_i) + 2 \sum_{i=0}^{N_p-1} \sum_{j=i+1}^{N_p-2} \vartheta\vartheta_j \phi(m_i, m_j)$$

-continued $$d(n) = \sum_{i=n}^{L-1} x(n)h(i-n),\ n = 0, \ldots, L-1$$

$$\phi(i, j) = \sum_{n=j}^{L-1} h(n-i)h(n-j),\ (j \geq i)$$

where $m_i$ represents a position of an $i^{th}$ pulse, and $\theta_i$ represents an amplitude of an $i^{th}$ pulse, h(n) represents an impulse response of the synthesis filter, x(n) represents a target signal for an adaptive codebook search, d(n) represents elements of a cross-correlation matrix $d=H^T x_2$, $x_2$ represents a target function of a perceptual domain, and H represents an impulse response function.

2. The method as claimed in claim 1, wherein the selected pulse combination includes two pulses.

3. The method as claimed in claim 1, wherein the selected pulse combination includes one pulse.

4. The method as claimed in claim 1, wherein the positions of the pulses of the initial vector are determined in a descending order of an absolute value of b(n) calculated by applying the following Equation to the respective subgroups:

$$b(n) = \beta \frac{res_{LTP}(n)}{\sqrt{\sum_{i=0}^{L-1} res_{LTP}(i) res_{LTP}(i)}} + (1-\beta) \frac{d(n)}{\sqrt{\sum_{i=0}^{L-1} d(i)d(i)}},$$

$$n = 0, \ldots, L-1$$

where β is a certain value between 0 and 1, and $res_{LTP}(n)$ is a residual signal determined by excluding a pitch component from an LPC (Linear Predictive Coding) residual signal.

5. The method as claimed in claim 1, wherein the amplitudes of the pulses of the initial vector are determined by a sign of b(n) calculated by applying the following Equation to the respective subgroups:

$$b(n) = \beta \frac{res_{LTP}(n)}{\sqrt{\sum_{i=0}^{L-1} res_{LTP}(i) res_{LTP}(i)}} + (1-\beta) \frac{d(n)}{\sqrt{\sum_{i=0}^{L-1} d(i)d(i)}},$$

$$n = 0, \ldots, L-1$$

where β is a certain value between 0 and 1, and $res_{LTP}(n)$ is a residual signal determined by excluding a pitch component from an LPC (Linear Predictive Coding) residual signal.

* * * * *